United States Patent [19]
Haneda et al.

[11] Patent Number: 4,970,536
[45] Date of Patent: Nov. 13, 1990

[54] APPARATUS FOR MULTICOLOR IMAGE FORMING WHEREIN IMAGE FORMING CONDITIONS ARE ADJUSTED BASED ON REFERENCE IMAGES

[75] Inventors: Satoshi Haneda; Hisashi Shoji; Seiichiro Hiratsuka, all of Hachioji, Japan

[73] Assignee: Konishiroku Photo Industry Co., Ltd., Tokyo, Japan

[21] Appl. No.: 206,944

[22] Filed: Jun. 9, 1988

Related U.S. Application Data

[60] Continuation of Ser. No. 849,709, Apr. 9, 1986, abandoned, which is a division of Ser. No. 757,519, Apr. 9, 1986, abandoned.

[30] Foreign Application Priority Data

| | | | |
|---|---|---|---|
| Jul. 27, 1984 | [JP] | Japan | 59-158456 |
| Jul. 27, 1984 | [JP] | Japan | 59-179119 |
| Sep. 7, 1984 | [JP] | Japan | 59-188690 |

[51] Int. Cl.[5] ...................... G01D 15/06; G03G 15/01
[52] U.S. Cl. .................................... 346/157; 355/246; 355/327
[58] Field of Search ............... 355/200, 210, 326, 327, 355/246; 346/153.1, 157, 160

[56] References Cited

U.S. PATENT DOCUMENTS

| | | | |
|---|---|---|---|
| 2,890,968 | 6/1959 | Giaimo | 355/4 X |
| 3,702,483 | 11/1972 | Fantuzzo | 355/4 X |
| 3,718,397 | 2/1973 | Smajo | 355/4 X |
| 3,756,718 | 9/1973 | Letzer | 355/4 X |
| 3,799,668 | 3/1974 | McVeigh | 355/4 |
| 3,815,988 | 6/1974 | McVeigh et al. | 355/4 X |
| 4,215,930 | 8/1980 | Miyakawa et al. | 355/14 D |
| 4,277,162 | 7/1981 | Kasahara et al. | 355/14 D X |
| 4,416,533 | 11/1983 | Tokunaga et al. | 355/4 |

*Primary Examiner*—Fred L. Braun
*Attorney, Agent, or Firm*—Jordan B. Bierman

[57] ABSTRACT

An apparatus having a plurality of developing devices for forming a multiple toner picture image composed of a plurality of layer toner picture images prepared from developed latent picture images formed on an image retainer by turning the image retainer a plurality of times. In the apparatus, latent reference images of different colors are formed on regions of the image retainer based on reference signals and the plurality of developing devices are used to develop the latent reference images to form a plurality of reference toner images. The data derived from the reference toner images is used to set up the image-forming conditions for forming a latent picture image on a common region of the image retainer, based on picture image signals received by the apparatus, when the toner picture image is formed on the image retainer.

17 Claims, 9 Drawing Sheets

APPARATUS FOR MULTICOLOR IMAGE FORMING WHEREIN IMAGE FORMING CONDITIONS ARE ADJUSTED BASED ON REFERENCE IMAGES

This application is a continuation of U.S. Ser. No. 849,709, filed Apr. 9, 1986, now abandoned, which in turn is a division of U.S. Ser. No. 757,519, filed July 19, 1984, now abandoned.

BACKGROUND OF THE INVENTION

1. Field of the Invention

This invention relates to a method and apparatus for forming a picture image by successively superposing a plurality of toner images for use in such processes as electrophotographing, computer output, facsimile, transmission recording and laser printers.

2. Description of the Prior Art

Multiple reference toner images in the following description are meant to designate those formed independently at different positions as different color reference toner images and at the same time as those formed with layers thereof at a position common to them.

In a method and apparatus for forming a plurality of toner images, for instance, a method and apparatus for forming a multicolor image, the image formed and recorded should be such that its image portion offers a high color density, a gradient faithful to the document being copied, and an excellent color balance, whereas the non-exposed portion is free from photographic fog. Japanese Patent Laid-Open No. 49-127629 and No. 50-20730 disclose methods for forming a reference toner image on an image retainer using a reference patch and controlling multicolor image quality according to the data derived from the reference toner image. In those known methods, a multicolor image is formed in the following order: For instance, a document and a reference patch are mounted on a document glass plate in such a manner that the latter is so positioned as to receive beams from a beam source prior to the former and the beams reflected from the reference patch and the document for image exposure are applied through a blue filter on an image retainer uniformly charged to form reference and picture latent images. Subsequently, a developing device containing yellow toner is used to develop and form a yellow reference toner image; and a yellow toner picture image is then formed based on the data derived from the reference toner image. The yellow toner picture image is transferred to recording paper supplied from a paper feeder at proper timing. The reference toner image and the residual toner image are removed from the image retainer and, after the residual charge has been eliminated, the image retainer is uniformly charged again to form reference and picture latent images by means of image exposure through a green filter. A developing device containing magenta toner is used in the same manner as above to develop a reference latent image and form a magenta reference toner image and a magneta toner picture image based on the data derived from the reference toner image. This toner image is piled on the yellow toner picture image already transferred to the recording paper in the preceding process. A cyan toner picture image is also transferred likewise and three primary color toner images are thus superposed. The recording paper is separated from a transfer drum and fixed before being discharged out of the apparatus.

Although the above method of forming a picture image has an advantage in that a multicolor image with improved image characteristics can be obtained, it also poses problems in that (i) the apparatus is large, and the time required for forming an image is lengthened because a transfer drum is used to transfer toner images to the recording paper each time the development of each color is completed; and (ii) misalignment in printing each color toner image because the repetition of the development and transfer process many times causes the color image formed to be out of register.

Accordingly, there has been proposed by, for instance, Japanese Patent Laid-Open No. 56-144452, Japanese patent application Nos. 58-184381 and 58-183152 a technique of superposing a plurality of toner picture images on an image retainer by means of reversal development and simultaneously transferring the image formed to recording paper.

Referring to a flowchart of FIG. 1, the typical image-forming principle of such a technique will be described subsequently.

In FIG. 1, there is shown a drum-shaped photo-sensitive member S together with positive surface potential E provided on the surface of the photo-sensitive member S, an image exposure portion PH of the photosensitive member S, a non-exposure portion DA of the photosensitive member S, an increase DUP in the potential because of the positively charged toner T adhering to the exposure portion PH in the first development and an increase CUP in the potential of the exposure portion PH because of the second charging.

The photosensitive member S is uniformly charged by a scorotron charging device and supplied with a constant positive surface potential E. The surface potential E is reduced almost to zero potential in the exposure portion PH in the first image exposure. A positive bias having a d.c. component extremely close to the surface potential E of the non-exposure portion is applied to a developing device to allow the reversal development, so that a first toner image (for instance, a yellow toner image) may be formed because the positively charged toner T within the developing device adheres to the exposure portion PH which has relatively low potential. Although the potential of the region where the toner image has been formed increases by DUP because of the positively charged toner T stuck thereto, the potential is further increased by CUP to provide the region with potential close to the surface potential E of the non-exposure portion as the second charging is provided by the scorotron charging device. Subsequently, the surface of the photosensitive member S wherein the roughly uniform surface potential E has been obtained is given the second image exposure to form an electrostatically charged image and a second toner image (for instance, a magenta toner image) is obtained through the same developing process as the aforementioned. By repeating the above-described process, a third toner image (for instance, a cyan toner image) is piled on the preceding ones and a multicolor toner image is obtained. The multicolor toner image is transferred to recording paper and fixed under pressure or with heat thereon and the paper is then discharged. After the transfer, the photosensitive member S is cleaned by a cleaning device in preparation for the formation of the next image.

The advantages of the aforementioned image-forming principle include the possibility of making a single transfer process sufficient, preventing the apparatus from becoming larger, image-forming time from being wasted and color toner images from being out of register.

As set forth above, use of data of the reference toner image by colors as disclosed in Japanese Patent Laid-Open No. 49-74034 may make it impossible to control the image characteristics in a desired mode when a multiple toner picture image is formed by superposing various color toner images on the image retainer. In addition to the problem above, a color image of good quality is ultimately unobtainable even though each color toner picture image is controllable, because the superposed final toner picture image is not effectively controlled.

In the apparatus for forming an image according to the Japanese Patent Laid-Open No. 49-74034, an area required for &he image retainer must be increased because the reference toner image is formed in the front position on the image retainer and the toner picture image is formed in the rear position based on the data derived from the reference toner image Consequently, the further problem is that the apparatus for forming an image is large and cannot be made compact.

In the typical apparatus for forming multicolor image, the image retainer is turned the number of times equal to that of toner images to form a plurality of toner picture images. In that case, the time consumed for recording becomes several times longer than that of an apparatus for forming a monochrome image, and this makes the formation of a multicolor image extremely inefficient.

SUMMARY OF THE INVENTION

In view of the foregoing, the present invention has been proposed and it is therefore an object of the present invention to provide a method and apparatus for forming an image wherein the improved transfer method is able to make the apparatus compact and accordingly the length of time required for forming an image shorter.

It is another object of the present invention to provide a method and apparatus for forming an image wherein data derived from a reference toner image is effectively utilized.

The above object can be accomplished by providing a method for forming an image by forming a multiple toner picture image composed of a plurality of layered toner picture images prepared from developed latent picture images formed on an image retainer by preferably turning the image retainer a plurality of times, the method comprising a process for forming reference latent images separately from the above latent picture images and a process for forming a multiple reference toner image composed of a plurality of layered toner reference images prepared from the developed reference latent images, so that the toner picture image-forming conditions may be set up according to the data derived from the reference toner image. The above object can further be accomplished by providing an apparatus for forming an image having a plurality of developing means for forming a multiple toner picture image composed of a plurality of layered toner picture images prepared from developed latent picture images formed on an image retainer by turning the image retainer a plurality of times, the apparatus comprising means for forming reference latent images separately from the above latent picture images for forming a multiple reference toner image composed of a plurality of layered toner reference images prepared from the developed reference latent images, so that the toner picture image-forming conditions may be set up according to the data derived from the reference toner image.

The present invention is characterized by the method and apparatus for forming an image by piling a plurality of toner picture images on an image retainer by rotating the image retainer a plurality of times and simultaneously transferring the layers of the toner images to recording paper, the method including the step of forming a multiple reference toner image composed of a plurality of the reference toner images to attempt the improvement in the image quality by controlling the process for forming the multiple toner picture image composed of the layers of the toner picture images. According to the present invention, it is preferred to use the output signal of an image pick-up element for scanning a document, a transmission signal from other equipment or the data stored in a memory as an image signal and modulate, for instance, a laser beam or drive an OFT, liquid crystal shutter or light emitting diode (LED) using the signal above to form a latent picture image on the image retainer. A reference signal for forming a reference latent image is added at this time prior to the application of the image signal above. The reference signal may be the image signal or one from a reference patch providing a desired color density difference. The reference latent image and the latent picture image are developed by a plurality of developing devices containing various kinds of color toner and preferably through the reversal development method based on the image-forming principle of FIG. 1 and the non-contact development method in and after the second development. In the above-described non-contact developing method, only the on/off switching of a.c. bias makes the developing operation controllable because such the developing method is favorably utilized for letting the toner contained therein to be flown across the gap to the image retainer by applying the a.c. bias. Accordingly, the processes for developing the reference latent image and the latent picture image are operated independently without affecting each other, whereby the toner image can be formed only when necessary without a waste of time. The developing operation can be suspended by turning off the a.c. bias, in addition to grounding the developing device as a whole or allowing the floating state. However, it may be further effective to separate the developing device from the image retainer or use means for removing the developer layer from the surface of the sleeve. The d.c. bias is so applied as to produce an electric field suppressing the flight of the toner when the a.c. bias is turned off.

Referring to FIGS. 2 through 8, there will be described typical image forming modes among various combinations of positions of forming the reference latent image, forming methods and developing methods. FIGS. 2 through 7 are flowcharts illustrating processes for forming a reference toner image and a toner picture image, whereas FIG. 8 is a cross sectional view illustrating a drum image retainer and a plurality of developing devices arranged on the outer periphery thereof. The image retainer of FIGS. 2 through 7 is illustrated as a development of the drum image retainer 1 on the plane and the moving direction of the surface of the image retainer is indicated by an arrow. The image retainer 1 of FIGS. 2 through 8 is, for instance, uniformly positively charged before being subjected to image exposure by an exposure system modulated or driven by reference and image signals, so that the reference latent image followed by the latent picture image may be formed. Subsequently, non-contact reversal development is carried out by yellow, magenta and cyan developing devices 5, 6 and 7 of FIG. 8 for piling up three color toner images to form a multiple reference toner image and a multiple toner picture image.

In the flowchart of FIG. 2, a region A is uniformly positively charged and subjected to image exposure based on the reference signal to form the reference latent image first and the image is developed by the developing device 5 to form a yellow reference toner image *2a*. Then magenta toner is used by the developing device 6 for development without charging and exposure, whereby yellow and magenta reference toner images are superposed at the same position to form a reference toner image *2b*. Moreover, a cyan reference toner image is developed by the developing device 7 likewise and three color reference toner images are piled up at the same position to form a multiple reference toner image *2c*.

A toner picture image *3a*, *3b* or *3c* is formed in the region B of the image retainer 1 based on the data derived from the reference toner image *2a*, *2b* or *2c* at the point of time the reference toner image *2c* is formed. In other words, the latent picture image is formed by providing the region uniformly and positively charged at the time of the formation of the reference toner image *2a* with the image exposure based on the yellow image signal and developed by the developing device 5 to form the yellow toner picture image *3a*. Subsequently, the latent picture image is formed by means of the recharging and image exposure based on the magenta image signal as required, and the latent image is then developed with magenta toner by the developing device 6, whereby the toner picture image *3b* is formed by piling the magenta toner picture image on the yellow toner picture image *3a*. Three color toner picture images are superposed to form the multiple toner picture image *3c* likewise after the image exposure based on the cyan image signal and the development with cyan toner by the developing device 7. The toner picture image *3c* is thus transferred to recording paper, whereas the reference toner image *2c* is removed by a cleaning device without being transferred thereto. The development of each latent image can be carried out or suspended independently by turning on and off the a.c. bias when necessary without affecting other operations.

The difference between the flowcharts of FIGS. 3 and 2 lies in the fact that the charge, exposure and development processes are repeatedly given to the region A of the image retainer 1 to form reference latent images by yellow (Y), magenta (M) and cyan (C) colors. As in the case of FIG. 2, these reference latent images are successively developed by the different color developing devices and the different color toner images *2a*, *2b* are superposed on the different color toner image *2c* to form the multiple reference toner image *2c*. As in the case of FIG. 2, the different color toner picture images *3a*, *3b* controlled according to the data derived from the reference toner images *2a*, *2b* or *2c* and three color toner picture images are piled up in the region B of the image retainer 1 to form the multiple toner picture image *3c* at the point of time the reference toner image *2c* is formed.

The difference between the flowchart of FIG. 4 and those of FIGS. 2 and 3 is that three color reference signals are written to the region A of the image retainer simultaneously to form three different color reference latent images 4 in mutually different positions. These reference latent images 4 are successively developed by colors each time they pass by each developing device as the image retainer turns once and the three color reference toner images are superposed at mutually different positions to form the multiple reference toner image *2c*. In the same manner as in the flowcharts of FIGS. 1 and 2, different color toner picture images *3a*, *3b* and different toner picture image *3c* are superposed in the region B of the image retainer 1 to form the multiple toner picture image *3c*.

The difference between the flowchart of FIG. 5 and what is shown in FIG. 2, 3 or 4 is that different color reference toner images are formed in parallel with different toner picture images. That is, the yellow reference toner image *2a* is first formed in the region A of the image retainer 1 through the positive charging, reference exposure and developing processes and the yellow toner picture image *3a* is formed in the region B of the image retainer 1 under control based on the data derived from the reference toner image *2a* through the image exposure and development processes. Subsequently, yellow and magenta toners are superposed at the same position of the yellow reference toner image in the region A through the developing process but without the charging and exposure processes to form the reference toner image *2b*. Then the yellow and magenta toner picture images are piled on the region B under control based on the data derived from the reference toner image *2b* through the charging, exposure and developing processes to form the toner picture image *3b*. In the same manner, the three yellow, magenta and cyan reference toners are piled up at the same position in the region A to form the multiple reference toner image *2c*. Then the three color toner picture images are piled on the region B to form the multiple toner picture image *3c*.

The difference between the flowchart of FIG. 6 and what is shown in FIG. 5 is that the charging, exposure and developing processes are repeated to form each color reference toner image. That is, the charging, exposure and developing processes are repeated to form the yellow, magenta and cyan color reference toner images on one reference latent image, whereas each color toner picture image is formed in parallel with the reference toner image on a color basis.

The difference between the flowchart of FIG. 7 and what is shown in FIG. 6 is that each color reference toner image is formed on the different reference latent image on a color basis. That is, the charging, exposure and developing processes are repeated to form the yellow, magenta and cyan color reference toner images on the reference latent images by colors, whereas each color toner picture image is formed in parallel with the reference toner image on a color basis.

Any of the image-forming modes utilizing the above-described toner image is designed to form layers of toner images on the photosensitive member by turning the photosensitive member the number of times equivalent to that of toner images and thus obtain a multicolor image superior in a color balance, image quality, gradation and free from misalignment in transferring the toner image using a compact apparatus for forming an image. By superposing according to the present invention is meant that each color toner image is formed within a common region and it includes all cases where the toner bearing portions of the toner images are located at a place entirely and partially common to them or entirely uncommon to them. In the flowcharts of FIGS. 2, 5 and 6, for instance, the toner bearing portions of the various reference color toner images are superposed and they are allowed to adhere to a place common to them, whereas in the flowcharts of FIGS. 3, 4 and 7 the toner bearing portions are separated from each other, that is, located at a mutually different place.

It is still another object of the present invention to improve the quality of a multicolor image in an apparatus for forming a multiple toner picture image by piling a plurality of toner picture images on an image retainer, forming a reference toner image separately and controlling the toner picture image according to the data derived from the reference toner image; and to make the apparatus as a whole compact by reducing the size of the image retainer by forming the toner picture image after removing the reference toner image.

The above object can be accomplished by providing a method for forming an image by forming a multiple toner picture image composed of a plurality of layered toner picture images prepared from developed latent picture images formed on an image retainer, the method comprising a process for forming reference latent images separately from the above latent picture images and a process for forming a multiple reference toner image composed of a plurality of layered toner reference images prepared from the developed reference latent images so as to form the plurality of toner picture images by preferably turning the image retainer a plurality of times after the plurality of reference toner images are removed. The above object can further be accomplished by providing an apparatus for forming an image having a plurality of developing devices for forming a multiple toner picture image composed of a plurality of layered toner picture images prepared from developed latent picture images formed on an image retainer and a cleaning device for removing toner on the image retainer, the apparatus comprising means for forming reference latent images separately from the above latent picture images for forming a multiple reference toner image composed of a plurality of layered toner reference images prepared from the developed reference latent images so as to form the plurality of toner picture images by preferably turning the image retainer a plurality of times after the plurality of reference toner images are removed by the cleaning device.

In the apparatus thus constructed for forming an image, the data of the reference toner image formed on the image retainer first is stored in a memory and the toner image is removed by the cleaning device, whereby the data stored in the memory is used to control the formation of the toner picture image. The image retainer may be a drum or an endless belt and the formation of the image may be implemented by turning the image retainer once or the number of times corresponding to that of toner images. With respect to the one-turn method, the drum diameter may be minimized theoretically provided that a drum photosensitive member is used as the image retainer when the toner picture image is formed after the reference toner is removed. However, it is normally preferred to employ the multi-revolution method because of image forming devices around the drum, difficulty in making the drum diameter smaller and a complication of the arrangement.

In the multi-revolution method, the drum diameter may be reduced to roughly the length of the picture image. For instance, in the case of an image in size B4, it is reducible up to the diameter of a drum whose circumference is about 370 mm long.

The reference toner image and the toner picture image according to the present invention are formed in such a manner that image exposure is first provided on the image retainer uniformly charged beforehand to form reference latent image and a latent picture image, which are developed by a plurality of developing devices containing toner of various colors.

Varieties of modes are possible as those for forming the reference toner image and the toner picture image according to the present invention and their typical examples are described by reference to flowcharts of FIGS. 14 through 16 and a partial cross sectional view of the apparatus for forming an image shown in FIG. 8.

The photosensitive member 1 of FIGS. 14 through 16 is uniformly positively charged before being subjected to image exposure by the exposure system modulated or driven by the reference signal to form the reference latent image. Subsequently, the image is reversely developed by the yellow, magenta and cyan developing devices 5, 6 and 7 on a non-contact basis, whereby three color toner reference images are superposed to form the multiple reference toner image 2c. In that case, the data derived from the reference toner image is stored in the memory and the reference toner image is simultaneously removed by the cleaning device. Then the image exposure modulated or driven by the image signal while it is controlled by the data stored in the memory is effected to form the latent picture image. Subsequently, the three color toner picture images developed by the developing devices 5, 6, 7 are superpose while they are controlled by the data stored in the memory, so that the multiple toner picture image 3c may be formed.

The image-forming modes in the flowcharts and the difference between them will be described in concrete terms as follows: The image exposure based on the yellow reference signal is effected to form the reference latent the image retainer 1 of FIG. 14 is uniformly charged. The image is developed by the developing device 5 to form the yellow toner image 2a. Then development is carried out by the developing device 6 using magenta toner without charging and image exposure and the magenta toner image is piled on the yellow toner image 2a at the same position to form the reference toner image 2b. In the same manner, the development is carried out by the developing device 7 using cyan toner and the three toner color images are piled up at the same position to form the multiple reference toner image 2c by turning the imager retainer 1 once or three times.

The reference toner image 2c is removed by the cleaning device and then the whole surface of the image retainer 1 is used to form the latent picture image and the toner picture image based on the data derived from the reference toner image 2a, 2b or 2c. In other words, the image retainer 1 free from the reference toner image 2c is uniformly positively charged and the image exposure based on the yellow picture image signal is effected to form the latent picture image, which is then developed by the developing device 5 to form the yellow toner image 3a. Subsequently, the image retainer is uniformly charged and the image exposure based on the magenta image signal is effected to form the picture latent image, which is then developed by the developing device 6 using magenta toner. The magenta image is piled on the yellow toner image 3a to form the toner picture image 3b. The image is developed by the developing device 7 using cyan toner in the same manner as above and three color toner images are piled up to form the multiple picture image 3c by turning the image retainer 1 three times. The toner image 3c is transferred to recording paper by the transfer device and fixed thereto. The image retainer 1 after the transference is cleaned in preparation for the next image formation.

The difference between the flowchart of FIG. 15 and what is shown in FIG. 14 is that various reference color toner images are subjected to uniform charging, image exposure and development by colors and positioned at different positions. That is, an electrostatically charged image is formed by effecting image exposure based on the yellow reference signal after the image retainer is uniformly positively charged and then developed with yellow toner to form the yellow reference toner image 2a. Subsequently, the latent picture image is formed in a position different from that of the yellow toner image 2a by effecting image exposure based on the magenta reference signal after recharging and then developed with magenta toner to form the magenta toner image. The magenta toner image and the yellow toner image 2a are piled up at a mutually different position to form the reference toner image 2b. In the same manner, the cyan toner image is also piled up thereon at a different position to form the multiple reference toner image 2c by turning the image retainer 1 three times.

The difference between the flowchart of FIG. 16 and those of FIGS. 14, 15 is that three color data are written to the image retainer at a time based on the reference signal and the reference latent images 4 are formed by colors at a mutually different position. In the flowchart of FIG. 15, the multiple reference toner image is formed by turning the image retainer three times, whereas it is formed by turning the retainer once. That is, the three yellow, magenta and cyan color reference signals are written simultaneously and the reference latent images are formed at a mutually different position. The reference latent images are successively developed by the developing devices 5, 6, 7 and superposed to form the multiple reference toner image 2c by turning the image retainer once.

It means the formation of various color toner images within a common region so that the toner images are superposed through the aforementioned image forming method wherein the toner bearing portions may be superposed at the same position, overlapped or not the least overlapped.

It is further object of the present invention to improve the color balance, gradient and quality of a multicolor image in the method and apparatus for forming a multiple toner picture image by piling a plurality of toner pictures imaged on an image retainer.

The above object can be accomplished by providing a method for forming an image by forming a multiple toner picture image composed of a plurality of layered toner picture images prepared from developed latent picture images formed on an image retainer, the method comprising a process for forming reference latent images separately from the above latent picture images and a process for forming a multiple reference toner image composed of a plurality of layered toner reference images prepared from the developed reference latent images so as to form the toner picture image according to the data derived from the reference toner image by turning the image retainer once.

The above object can further be accomplished by providing an apparatus for forming an image having a plurality of image exposing devices for forming a plurality of latent picture images and a plurality of developing devices for forming the plurality of toner picture images prepared from the developed latent picture images, the apparatus comprising means for forming a plurality of reference latent images by means of a plurality of image exposing devices in a region different from the latent picture image and means for forming the multiple reference toner image composed of a plurality of reference toner images piled up by developing the reference latent images formed by the above means using the plurality of developing devices, so that the toner picture image-forming conditions may be set up according to the data derived from the reference toner image formed by the above means.

In the apparatus thus constructed for forming an image, although the toner picture images respectively corresponding to the reference toner images of the plurality of reference toner images may be formed alternately and repeatedly, this method tends to make the image forming process complicated and limit the utilization of the surface of the image retainer where an image is formed to a narrow range. Accordingly, the toner picture image should preferably be formed after the plurality of reference toner images are formed. In this case, the data of the reference toner image formed before is stored in the memory and the reference toner image is cleaned by the cleaning device without being transferred on the recording paper. However, the toner picture image is formed based on the data stored in the memory during the cleaning process and transferred to the recording paper. The plurality of reference toner images are piled and formed by the former half of a turn of the drum-shaped or endless image retainer such as a drum image retainer and the plurality of toner picture image are then formed. Consequently, the reference toner image has already been removed when the toner picture image is transferred. For this reason, the surface of the image retainer for use in forming an image can fully be utilized when the toner picture image is formed. Moreover, the length of the image formed in the longitudinal direction may be greater than the outer circumference of the drum, when the drum is turned further by the difference therebetween to form an image. In that case, the apparatus can be made compact because the size of image retainer is reducible and thus the formation of an image is carried out efficiently.

There are various modes for forming the reference toner image and the toner picture image according to the present invention and, referring to flowcharts of FIGS. 17, 18, 7 and a partial cross sectional view of an apparatus for forming an image of FIG. 19, such modes will be described. The image retainer 1 shown in FIGS. 17, 18, 7 is a development of the drum image retainer 1 on the plane with an arrow indicating its moving direction.

Referring to the flowchart of FIG. 17 and the partial cross sectional view of the apparatus of FIG. 19 for forming an image, the first image forming mode will be described. A reference latent image 4a is formed by subjecting image exposure L based on the reference signal after a region A is uniformly positively charged by a scorotron charging device 105 first and developed by the developing device 5 to form the yellow toner reference image 2a is formed. Subsequently, there are subjected recharging by a scorotron charging device 106 and the image exposure L based on the reference signal to form a reference latent image 4*b*, which is developed by the developing device 6, whereby the magenta toner reference images are piled at a position different from that of the yellow color reference image 2*a* to form the reference toner image 2*b*. Further, the cyan toner reference images are piled to form the multiple reference toner image 2*c* in the region A through the recharging process by a scorotron charging device 107 and the developing process by the developing device 7. However, the reference toner image 2*c* is subsequently removed by the cleaning device. The formation of the reference toner image 2*c* is followed by uniform positive charging by the charging device 105 based on the data of the reference toner images 2*a*, 2*b* or 2*c* and image exposure based on the image signal and developed by the developing device 5 to form the yellow toner picture image 3*a* in the region B.

Subsequently, recharging by the charging device 106 and the image exposure L based on the image signal are effected after the toner picture image 3*a* is formed and completed in the region A and the magenta toner picture image is piled on the yellow toner picture image 3*a* developed by the developing device 6 to form the toner picture image 3*b*. In the same manner, the cyan toner picture image is piled thereon through the recharging by the charging device 7 and development by the developing device 7 to form the multiple toner picture image 3*c*.

Referring to a flowchart of FIG. 18, the next image forming mode will be described. As the image retainer 1 is started rotating, the charging devices 105, 106, 107 are simultaneously operated to charge the region A on the image retainer 1 in such a manner as to positively charge portions separated from each other and image exposure L based on the reference color signal is subsequently effected to simultaneously form the reference latent images 4*a*, 4*b*, 4*c*. These reference latent images are developed by the developing devices 5, 6, 7 simultaneously operated to form various color toner reference images are formed at respective positions. That is, the yellow toner reference image 2*a* is piled on the magenta toner reference image to form the reference toner image 2*b* and on the cyan toner reference image to form the multiple reference toner image 2*c* in the region A. Then the yellow toner picture image 3*a* is formed in the region B through the uniform positive charging by the charging device 105, the image exposure based on the image signal and the development by the developing device 5. Subsequently, the toner image 3*a* is formed up to the region A of the image retainer to complete the yellow toner picture image 3*a*. The above process is repeated thereafter to obtain the toner picture image 3*b* with the magenta toner picture image piled thereon and the multiple toner picture image 3*c* with the cyan toner picture image piled thereon, whereby there are transferred to recording paper. On the other hand, the reference toner image 2*c* is removed by the cleaning device.

Referring to the flowchart of FIG. 7, the last image forming mode will be described. In this image forming mode, the yellow toner reference image 2*a* is formed in the region A and subsequently the yellow toner picture image 3*a* is formed in the region B. Then the reference toner image 2*b* with the magenta toner reference image piled thereon is formed and the toner picture image 3*b* with the magenta toner picture image piled thereon is subsequently formed. The multiple reference toner image 2*c* with the cyan toner reference image piled thereon is formed last in the region A and subsequently the multiple toner picture image 3*c* with the cyan toner picture image piled thereon is formed in the region B. The reference toner image 2*c* is removed, whereas the toner picture image 3*c* is transferred to recording paper. In this image forming mode, toner image and the toner picture image are formed alternately.

The multiple toner picture images in the abovedescribed three image forming modes are all formed by turning the image retainer once.

Other objects and features of the present invention will be more clearly understood with reference to the following drawings and description.

BRIEF DESCRIPTION OF THE DRAWINGS

FIG. 8 is a cross sectional view of the principal portion of an apparatus for forming an image in examples 1 and 2 of the present invention.

DESCRIPTION OF THE PREFERRED EMBODIMENTS

Referring to the embodiments of the present invention, the present invention will be described in detail; however these examples are not to be construed to limit the scope of the invention.

EXAMPLE 1

Figure 9:
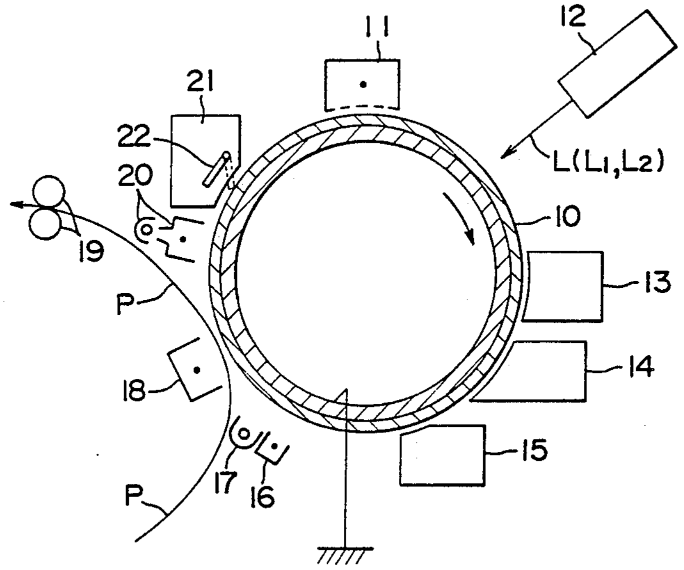
Figure 11:
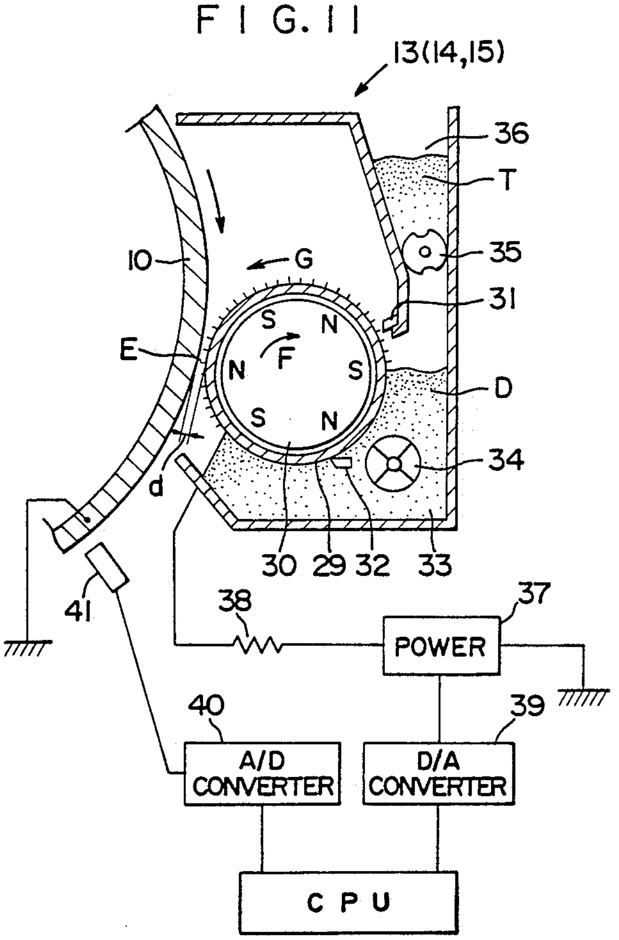
FIG. 11 is a cross sectional view of the developing device.
Figure 10:
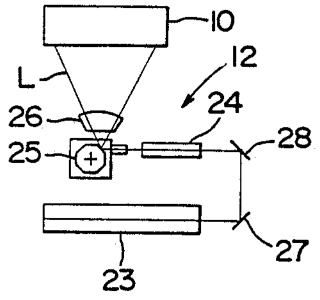
FIG. 10 is a cross sectional view of the laser.
Figure 12:
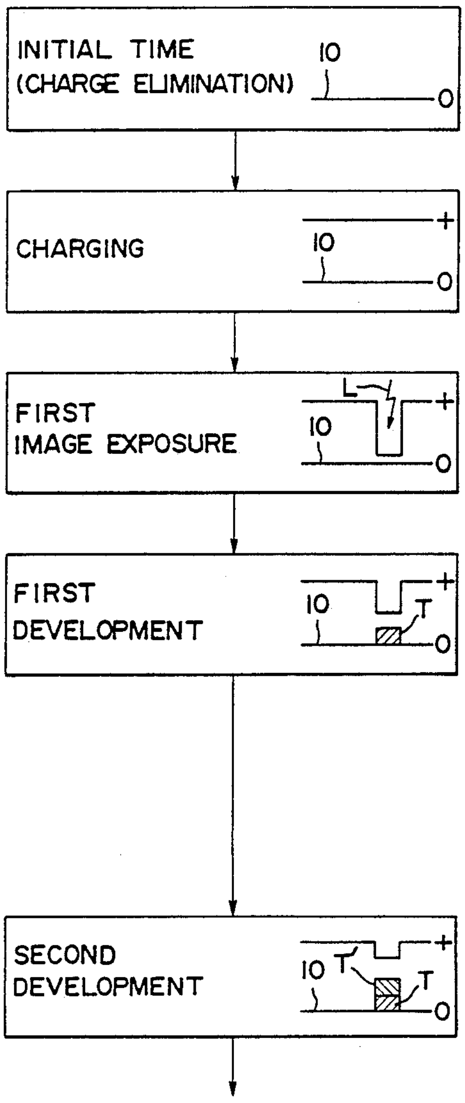
FIGS. 12 and 13 are flowcharts illustrating the developing modes in examples 1 and 2 of the present invention.

FIGS. 9 through 11 are intended to describe the embodiments of the present invention; FIG. 9 is a cross sectional view of the principal portion of an apparatus for forming a three color picture image; FIG. 10 is a cross sectional view of a laser beam exposure device; FIG. 11 is a cross sectional view of a developing device; and FIG. 12 is a flow-chart illustrating the developing mode of a reference toner image.

Figure 1:
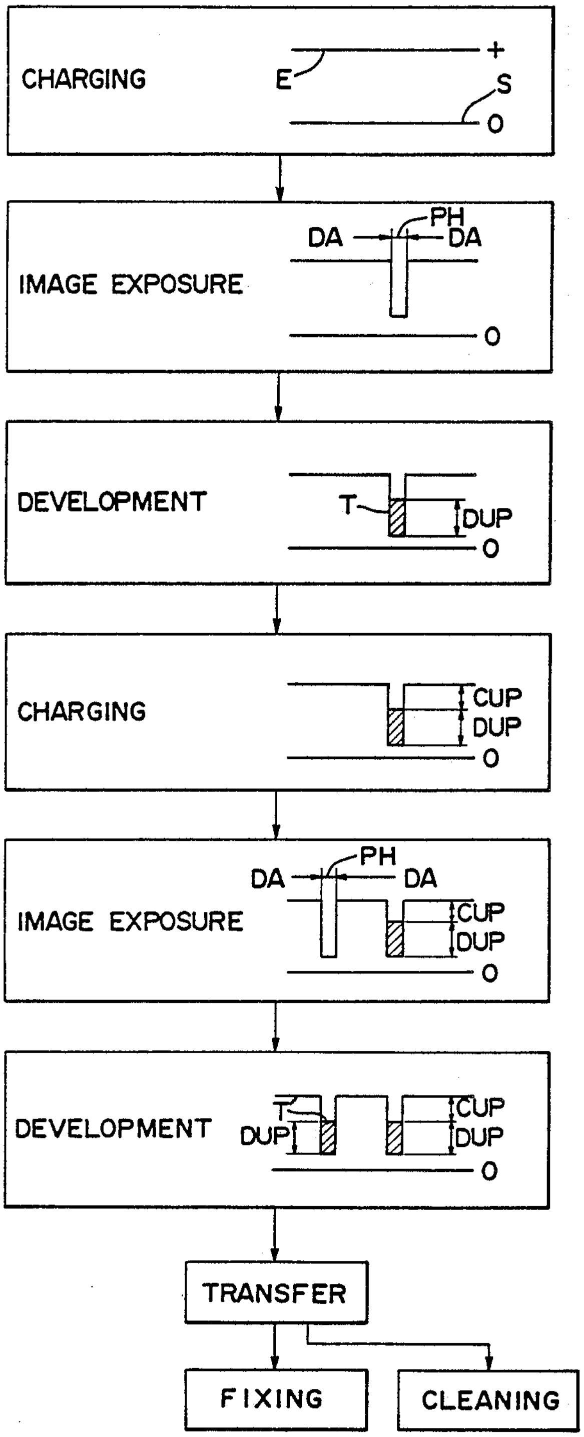
FIG. 1 is a flowchart illustrating an image forming principle using a known reversal development.
Figure 2:
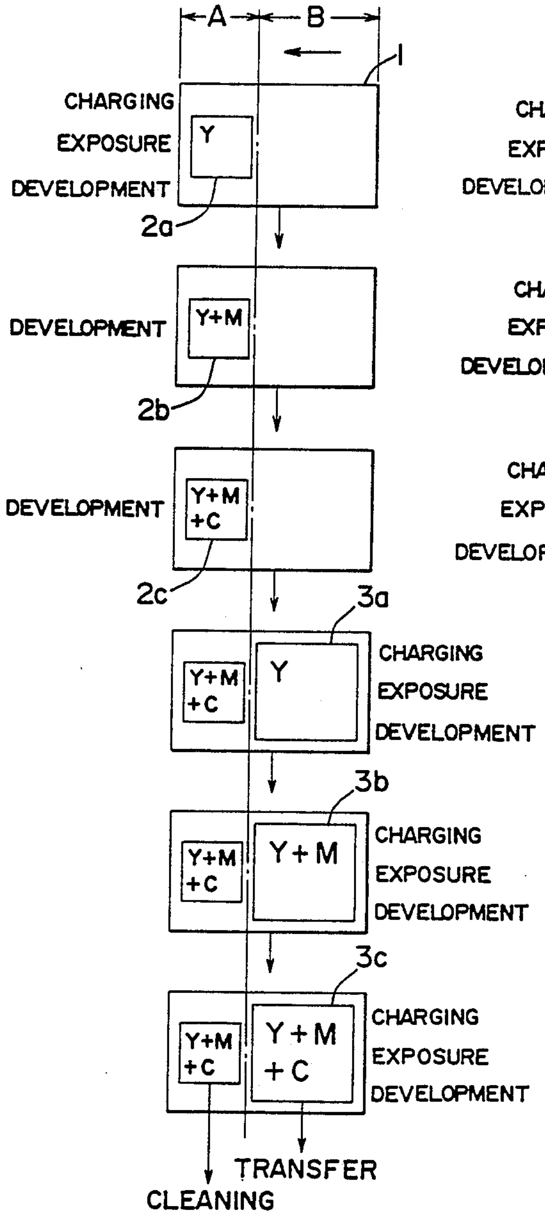
FIGS. 2 through 7 are flowcharts illustrating each an image forming mode embodying the present invention.

The apparatus for forming an image of FIG. 9 is used in this example and the image is formed according to the image forming mode of FIG. 2. In FIG. 9, a drum photosensitive member 10 prepared from a material such as selenium is rotated at a peripheral velocity of 180 mm/sec in the direction of an arrow. The surface of the photosensitive member 10 is uniformly charged with +600 V by a charging device 11 such as a scorotron charging device. Among the electric signal of the image forming mode shown in the flowchart of FIG. 2, the yellow (Y) reference signal is applied to a laser device 12 of FIG. 10 and beam irradiation (first image exposure) using a laser beam L modulated by the signal above is effected on the charged surface of the photo-sensitive member 10 to form a reference latent image in the region A of the photo-sensitive member 10. The latent image is reversely developed (first development) by a developing device 13 to form the yellow toner reference image (*2a* of FIG. 2) bearing yellow toner T. Subsequently, the latent image is reversely developed (second development) by a developing device 14 without being subjected to charging and exposure to form the magenta toner reference image bearing magenta toner T′, which is piled on the yellow toner reference image to form the reference toner image (*2b* of FIG. 2). In the same manner, the image is reversely developed by a developing device 15 and piled on the cyan toner reference image to form the multiple reference toner image (*2c* of FIG. 2). FIG. 12 shows this developing mode. That is, the yellow toner T, magenta toner T′ and cyan toner are successively made to adhere the yellow reference latent image at the same position to form the multiple reference toner image.

Figure 13:
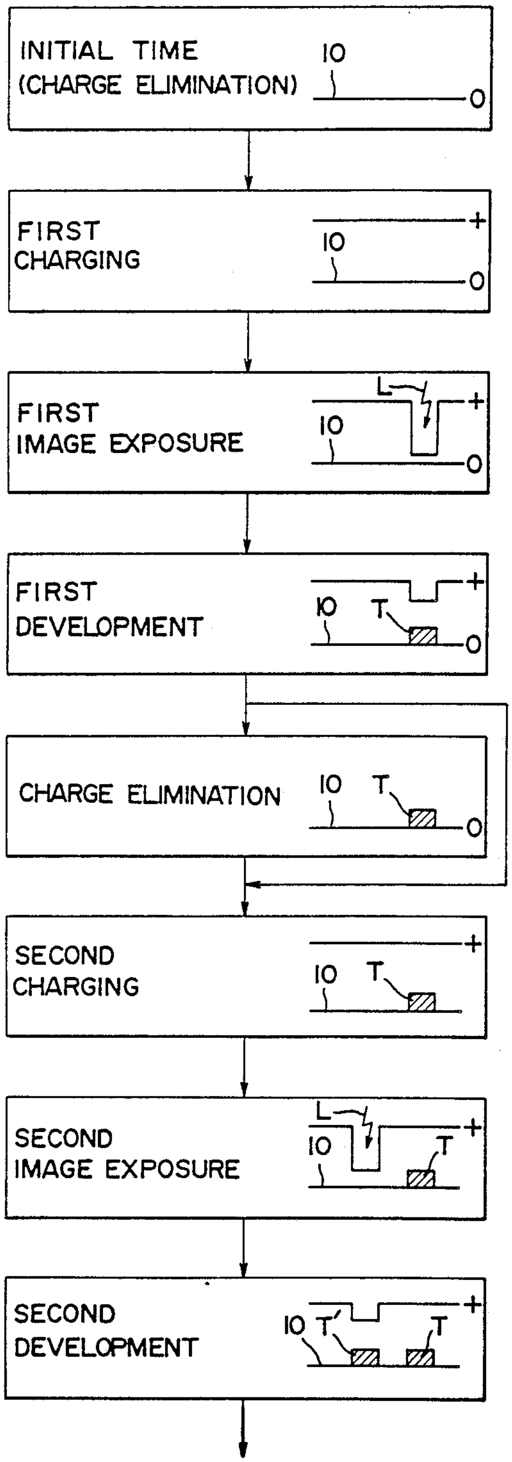

The multicolor toner image is formed under control based on the data derived from the reference toner image. In other words, image exposure (first image exposure) by the laser beam L modulated as the result of the application of the yellow image signal is provided for the region B (see FIG. 2) of the photosensitive member 10 already uniformly positively charged at the time of the formation of the reference toner image, so that the latent picture image may be formed. The latent image is developed (first development) by the developing device 13 and allowed to bear yellow toner T to form the yellow toner picture image (*3a* of FIG. 2). Subsequently, the latent picture image is formed on the recharged (second charge) photosensitive member 10 through the image exposure by the laser beam L modulated by the magenta image signal. The latent image is developed (second development) by the developing device 14 and allowed to bear magenta toner T′, whereby the magenta toner image is superposed and formed (*3b* of FIG. 2) on the yellow toner picture image. In the same manner, the multiple toner picture image (*3c* of FIG. 2) with the cyan toner picture image piled thereon is formed through the recharge (third charge), the image exposure (third image exposure) by the cyan image signal and the development by the developing device 15. FIG. 13 shows the developing mode of the toner picture image thus formed. That is, the yellow toner T is made to adhere to the yellow latent picture image, the magenta toner T′ onto the magenta latent picture image and the cyan toner onto the cyan latent picture image, whereby they are superposed to form the multiple toner picture image.

The multiple toner picture image is made transferable by the operation of a charging device 16 before transfer and an exposing device 17 before transfer before and transferred to recording paper P supplied synchronously with the photosensitive member 10 by the operation of a transfer electrode 18. Then the recording paper P is carried by a carrier roller 19 and discharged with the image fixed thereon. On the other hand, the photosensitive member 10 after transfer is de-electrified by the charging device 16 and the residual toner and the reference toner are removed by a blade 22 of a cleaning device 21 which has been released during the formation of the image.

FIG. 10 is a cross sectional view illustrating the construction of the laser device 12 comprising a laser beam source 23, a modulator 24 operated by an external signal, a multi-plane reflecting mirror 25, a focusing lens 26 and reflecting mirrors 27, 28.

FIG. 11 is a cross sectional view illustrating the construction of the developing devices 13, 14, 15, each comprising a developing sleeve 29 composed of a non-magnetic material such as aluminum and stainless steel, a magnet 30 installed in the developing sleeve 29 and having a plurality of magnetic poles in the peripheral direction thereof, a blade 31 for regulating the thickness of a magnetic or non-magnetic developer layer formed on the developing sleeve 29, a scraper blade 32 for removing from the developed sleeve the developer layer after development, a rotary body 34 for stirring the developer in a developer trough 33, a toner hopper 36, a toner supply roller 35 having recesses for storing toner and supplying the toner from the toner hopper 36 to the developer trough 33 and a power supply 37 for applying bias voltage containing, if necessary, an a.c. voltage component to the developing sleeve 29 through a protective resistor 38 and forming an electric field for controlling the movement of toner between the developing sleeve 29 and the image retainer 10. Although the developing sleeve 29 and the magnet 30 are shown to turn in the direction of arrows, the developing sleeve 29 or the magnet 30 may be fixed, or they may be turned in the same direction. When the fixed magnet 30 is used, magnetization is intensified or two magnetic poles equally or oppositely polarized are installed close to each other to make the magnetic flux density of the poles facing the image retainer greater than that of the other poles.

The poles of the magnet 30 of such a developing device are normally magnetized at a magnetic flux density of 500~1,500 gausses and the magnetic forces allow the thickness of the developer attracted onto the surface of the developing sleeve 29 from the developer trough 33 to be regulated and the developer layer is moved in the direction of or opposite to (the same direction in the drawing) that of the photosensitive member 10 so as to develop electrostatic images of he photosensitive member 10 in the region E on the surface of the developing sleeve 29 opposite to the photosensitive member 10, whereas the rest is removed from the surface of the developing sleeve 29 by the scraper blade 32 and returned to the developer trough 33. At least in and after the second development to be repeated for piling color toner images, non-contact development is preferred so as to prevent the toner adhering to the photosensitive member 10 in the preceding development from being shifted in the following development. The gap between the photosensitive member 10 and the developing sleeve 29 and the thickness of the developer layer are so arranged that the developer is prevented from making contact with the photosensitive member 10 while it is not charged or when there is no difference in potential between the member 10 and the sleeve 29.

The reference latent image in this example is developed with the oscillation bias in the power supply 37 for the developing devices 13, 14, 15 as a reference oscillation bias and thus the reference toner image is formed. The reference toner image is detected by optical means for measuring the reflecting density with, for instance, light emitting and receiving elements as a set. The detected data is (1) compared with the data stored in the memory arranged in CPU so that a proper bias value as the voltage applied at the time of development of the latent picture image. Moreover, (2) a proper bias value is selected from the reference oscillation bias value varying according to a predetermined program to set the bias value at the time of development of the latent picture image. Further, the detected data is compared with the data stored in the memory in the CPU and (3) used to control the charged potential to the photosensitive member 10 and/or the quantity of image exposure. In FIG. 11, there is also shown an arrangement of a D/A converter 39, an A/D converter 40 and a photosensor 41 for measuring the reflecting density.

Although an a.c. component of 2 KHz, 1.2 KV and a d.c. bias component of +500 V are applied to the power supply 37 at the time of development in this example, the value is made changeable for control purposes according to the data from the reference toner image. The sleeve 29 having a diameter of 30 mm is rotated at 65 r.p.m. in the direction of the arrow, whereas the gap d between the sleeve 29 and the photosensitive member 10 in the developing region E is set at 1,000 μm. The gap between the sleeve 29 and the thickness regulating blade 31 is set at 300 μm, and the thickness of the developer layer is about 700 μm and the number of revolutions of the magnet 30 having six N, S poles with a magnetic flux density of 900 gausses in the direction of the arrow is 700 r.p.m.

As the developer for use in this example, it is preferred to use, the so-called two-component developer clear in color, unnecessary to let the toner contain a black or brown magnetic substance, capable of controlling the charge and composed of a mixture of non-magnetic toner and magnetic carrier. As the magnetic carrier in particular, use can be made of stylene, vinyl, ethylene, rosin denaturazied, acryl, polyamide, epoxy or polyester resin with a ferromagnetic substance or fine particles of a magnetic substance such as triiron γ-ferric oxide, chrome dioxide, manganese oxide, ferrite, manganese-copper alloy dispersed therein, or magnetic substance whose surface is coated with such resin with a resistivity of more than $10^3$ Ωcm, preferably $10^{13}$ Ωcm. If the resitivity is low, a charge will be injected into the carrier particle when the bias voltage is applied to the developing sleeve 29 and it will cause the carrier particle to stick to the surface of the image retainer 10 or prevent the bias voltage from being sufficiently applied thereto. In particular, if the carrier is allowed to adhere to the image retainer 10, the tone of the color image will be adversely affected.

The resistivity is the value obtained by reading the current value when voltage is so applied across the electrode used as a load and the bottom electrode as to produce an electric field of 1,000 V/cm while applying a load of 1 Kg/cm$^2$ onto the packed particles after the particles are put in a container having a cross section of 0.50 cm$^2$ and subjected to tapping.

Moreover, a carrier consisting of particles less than 5 μm in mean diameter is incapable of providing sufficient magnetization, whereas one which consists of particles larger than 50 μm fails to improve the image quality, makes breakdown and discharge likely to occur and the application of high voltage impossible. Accordingly, a mean particle diameter of more than 5 μm and less than 50 μm is preferred and, if necessary, an additive such as hydrated silica, or a fluid agent is added.

It is preferable to use toner composed of resin containing various pigments and, if required, a charge control agent and having a mean particle diameter of 1~20 μm and a mean charged quantity of 3~300 μc/g and particularly 5~30 μc/g. If toner having a mean particle diameter of less than 1 μm is used, it will hardly be separated from the carrier and, if it exceeds 20 μm, the resolution of the image will be decreased.

Use of a developer being a mixture of the insulating carrier and toner facilitates setting of bias voltage to be applied to the developing sleeve 29 of FIG. 11 in that sufficient toner is allowed to stick to the electrostatic image without photographic fog. Magnetic substance for use in the magnetic carrier may be contained in toner to provide effective control over the development and transfer of the toner by the application of bias voltage on condition that the clarity of toner color is not impaired.

It is evident that the present invention is also applicable to not only two-component development but also to non-contact development using a one-component developer as disclosed by U.S. Pat. No. 3893418 and Japanese Pat. Laid-Open Nos. 55-18656/55-18659. In addition, those methods disclosed by Japanese Pat. Laid-Open Nos. 56-125753, 59-42565 and Japanese patent application Nos. 58-97973 and 58-231434.

In this example, there is used a carrier containing 50 weight % magnetite dispersed in resin having a mean particle diameter of 20 μm with magnetization at 30 emu/g and resistivity at higher than $10^{14}$ Ωcm. As toner, there is used styleneacryl resing with a benzidine derivative as a yellow pigment, rodamin B as a magneta pigment and 10 weight part of a copper phthaloamine pigment and 2 weight part of a positive charge control agent contained therein, the mean particle diameter being 10 μm. The developer used in this example is a two-component developer containing 20 weight % toner.

In this example, because an external image signal is used to form an image, any time and position where the reference latent image is formed on the photosensitive member 10 can be selected. However, a time and position suitable for feeding back the data to the latent picture image should preferably be selected. In order to feed back sufficient data from the reference toner, a mode for forming the toner picture image after the completion of the formation of the reference toner image is preferred (modes of FIGS. 2 through 4). The order of forming yellow (Y), magenta (M) and cyan (C) may freely be altered to suit the purpose. Thus it is possible to obtain a color image offering excellent image quality, color balance and gradient under control of the data derived from the reference toner image.

EXAMPLE 2

Figure 3:
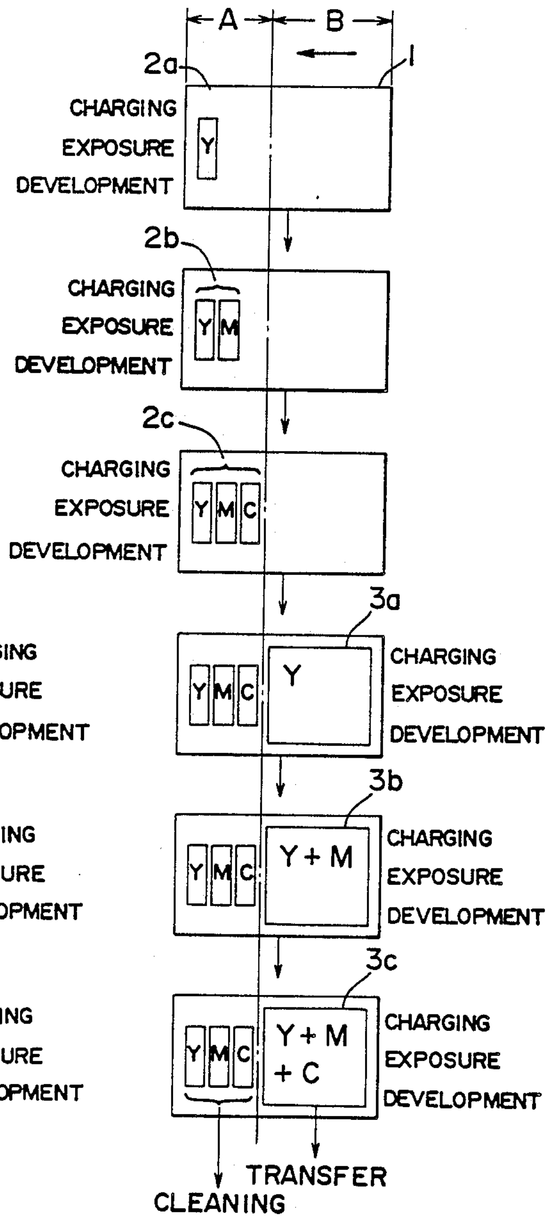
Figure 4:
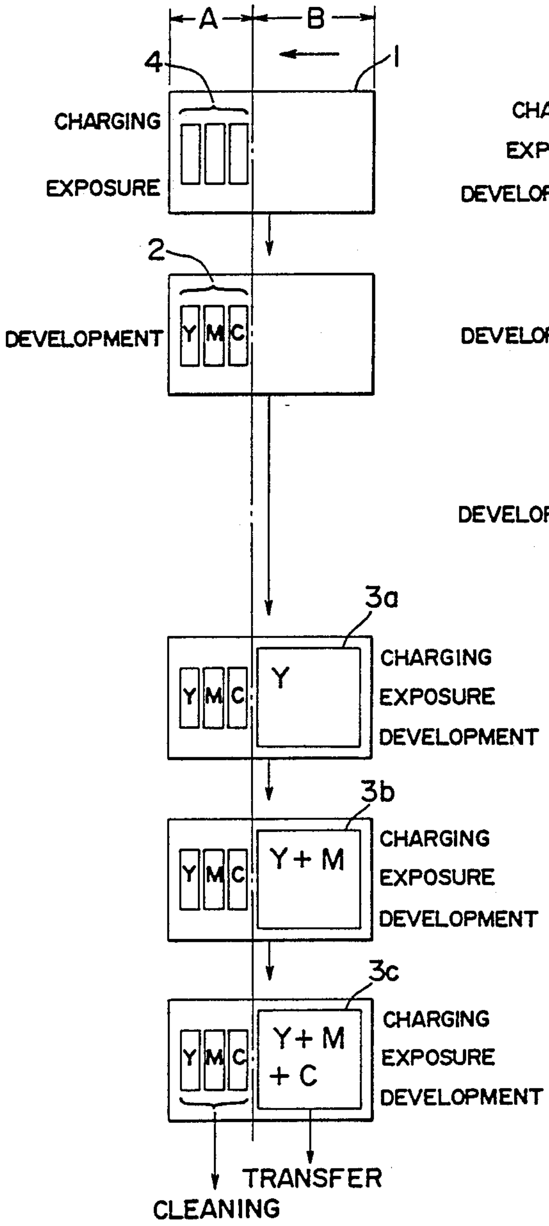
Figure 5:
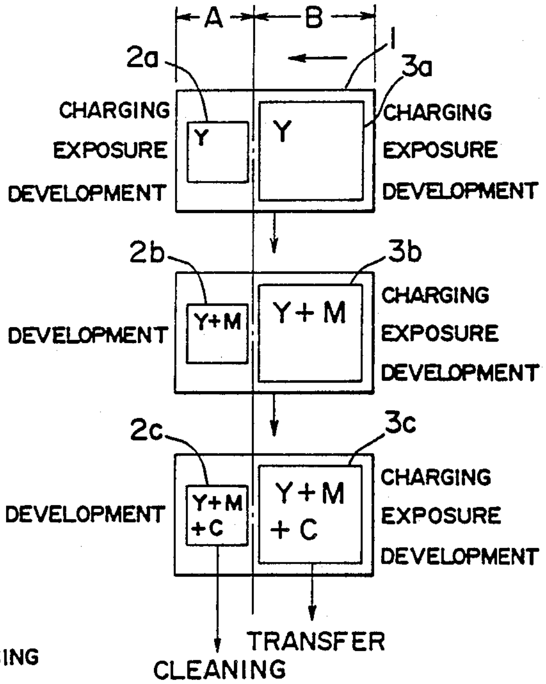
Figure 8:
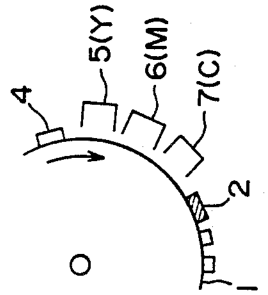
FIG. 8 is a cross sectional view illustrating a photosensitive member and developing devices arranged on the outer periphery thereof.
Figure 7:
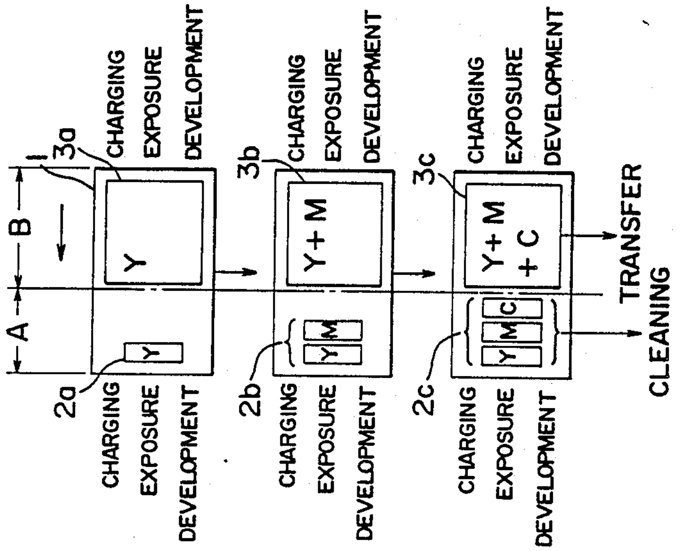
Figure 6:
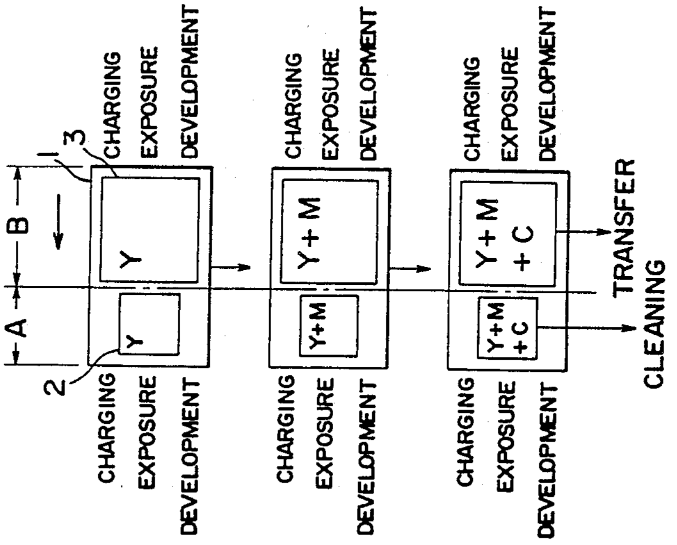

The difference between this example and the first one is that, as shown by the flowchart of FIG. 3, the yellow, magenta and cyan color toner reference images are superposed not at the same position but separately and close to each other. For this reason, although charging, exposure and development must be repeated each time the reference toner image is formed, the advantage is that data is fed back more accurately. The developing mode of the reference toner image in this case is shown in FIG. 13 and other image forming conditions are the same as those of the first example. As shown in FIG. 13 (charge elimination), the process for eliminating the charge can be omitted when necessary.

As is obvious from the examples 1, 2, the apparatus can be made compact, whereas the image forming time can effectively be shortened because the layers of toner images on the image retainer are transferred to recording paper at a time. Moreover, because the formation of an image is based on data, the quality, gradient and color balance of the color image are effectively controlled. Since a plurality of toner images are superposed to form an image, the non-contact development through the reversal development under the a.c. bias can be employed. As a result, a clear image is obtainable, with the reduced wear of the photosensitive member, and the time for developing each latent image is controlled effectively, readily and rationally without waste of time.

EXAMPLE 3

Figure 20:
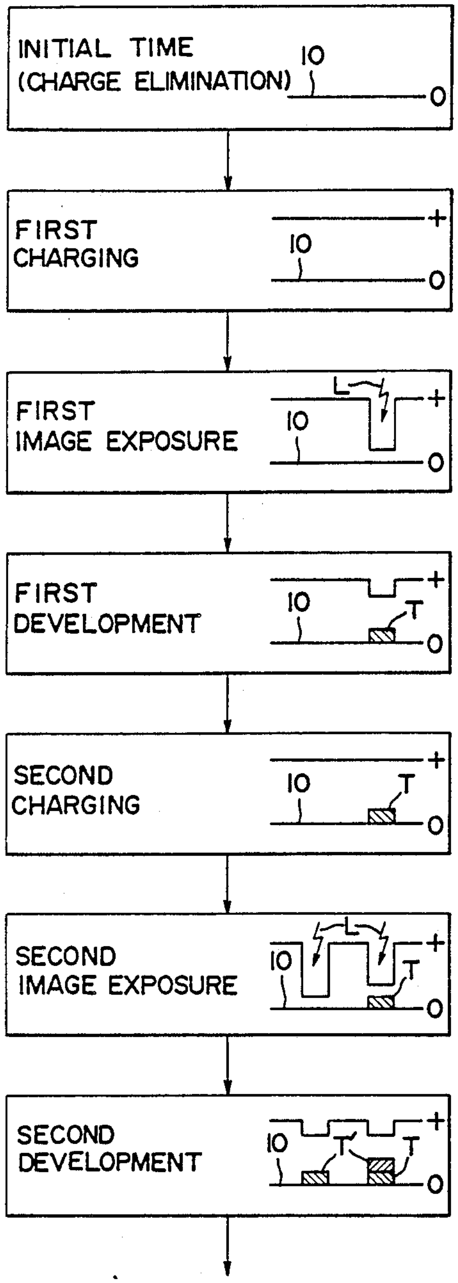
FIG. 20 is a flowchart illustrating the developing mode of the image toner image employed in the examples.

FIG. 20 is a flowchart illustrating the development mode of the toner picture image in this example.

Figure 14:
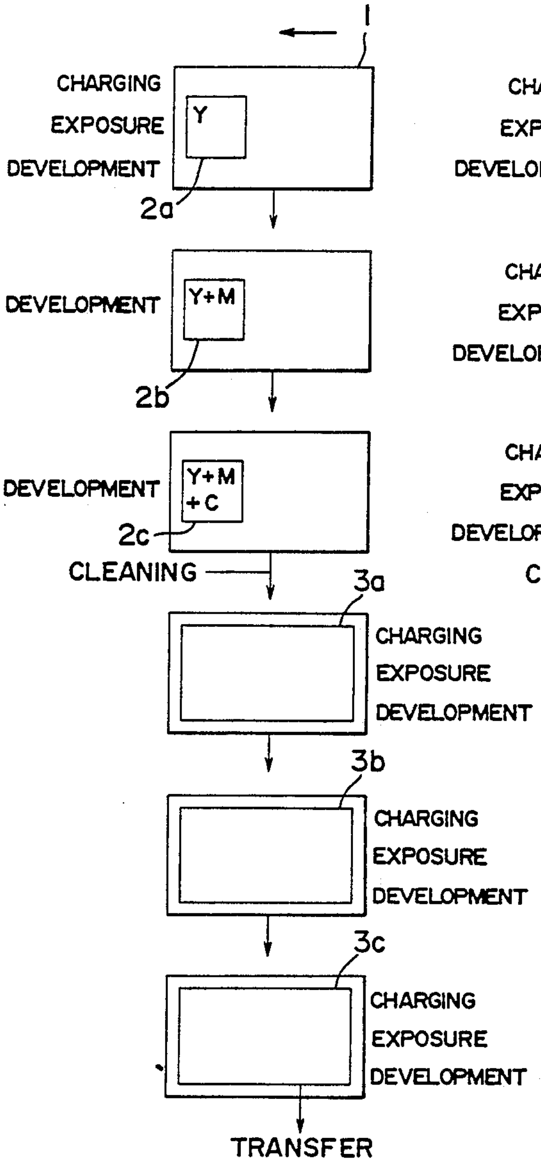
FIGS. 14 through 18 are flowcharts illustrating image forming modes in another example of the present invention.

In this example, an image is formed according to the flowchart of FIG. 14 by the apparatus of FIG. 9 for forming an image. In other words, the reversal development (first development) is carried out by the developing device 13 shown in the developing mode of FIG. 12 to form the reference toner image (*2a* of FIG. 14) bearing yellow toner T. Subsequently, the image is reversely developed (second development) by the developing device 14 without charging and image exposure and the reference toner image (*2b* of FIG. 14) is formed as the magenta toner T' is made to adhere to the yellow toner T. In the same manner, the multiple reference toner image (*2c* of FIG. 14) reversely developed (third development) by the developing device 15, with the cyan toner image piled thereon at the same position, is formed by turning the image retainer 10 once.

The multiple reference toner image whose data is stored in the memory is removed by the charge eliminating device 20 before cleaning and the blade 22 of the cleaning device 21 and subsequently almost the whole surface of the image retainer 10 is used to form the toner picture image based on the memory data. That is, the latent picture image is formed by laser beam $L_2$ irradiation (first image exposure) from the laser device 12 modulated by the yellow image signal after the whole surface of the image retainer 10 is uniformly charged with +600 V and developed (first development) by the developing device 13 to form the yellow toner picture image (*3a* of FIG. 14). Then the latent picture image is formed by laser beam $L_2$ irradiation (second image exposure) modulated by the magenta image signal after the image retainer 10 is recharged and subsequently developed (second development) by the developing device 15, whereby the magenta toner picture image is piled on the yellow toner picture image (*3b* of FIG. 14). In the same manner, the multiple toner picture image (*3c* of formed by turning the image retainer three times through recharging and the image exposure (third image exposure) based on the cyan image signal and the development by the developing device 15. The flowchart of FIG. 20 shows the development of the toner picture image. That is, the second and third development allows the toner to adhere to those regions where the toner has adhered as well as those where it has not adhered in the preceding process.

EXAMPLE 4

Figure 15:
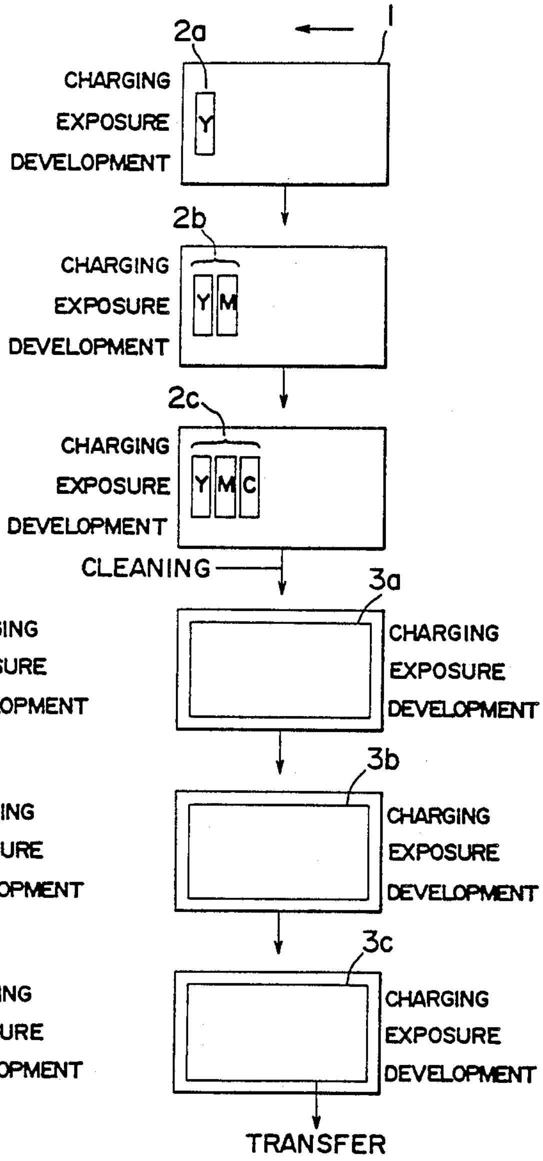
Figure 16:
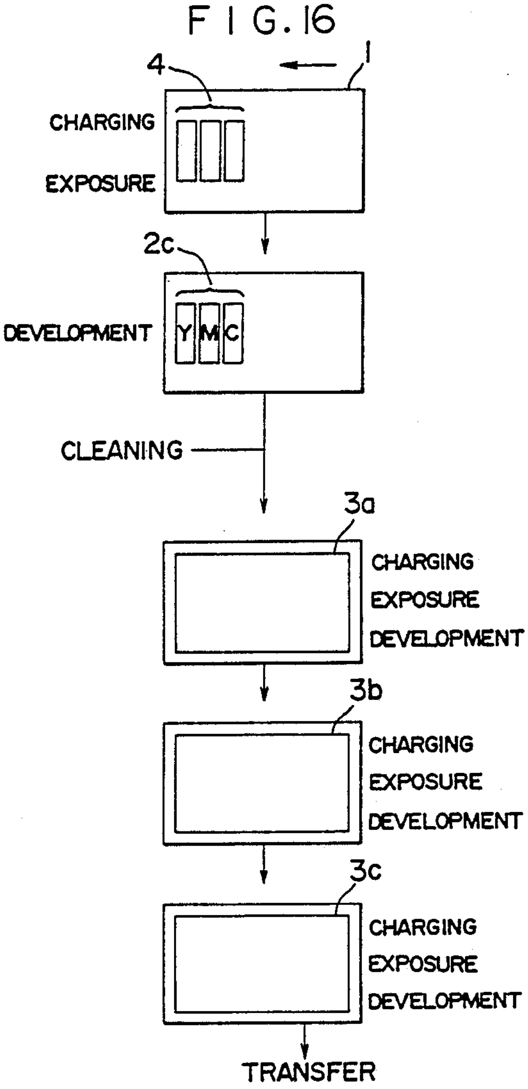

The difference between this example and the example 3 is that the yellow, magenta and cyan color toner reference images are not superposed at the same position but are formed close to each other at a mutually different position by turning the image retainer 10 three times, as shown in the flowchart of FIG. 15. For this reason, the charging, exposure and development must be repeated to form each reference toner image and this process is shown by the flowchart of FIG. 13. That is, the position where the toner has adhered in the first development differs from that where the toner has adhered in the second development. The image forming mode of the reference toner image in this example, however, is close to the image forming mode of the toner picture image, the advantage being that effective data is readily obtainable.

As is obvious from the examples 3, 4, according to the present invention, because the plurality of toner images are piled up on the image retainer and transferred to recording paper simultaneously, the transfer drum is not required, and further, the image retainer can be made small because almost the whole surface of the image retainer is utilizable for forming the toner picture image, hence, the apparatus for forming an image can be made more compact. Moreover, the formation of an image based on the data derived from the reference toner image makes possible the formation of a multicolor image of good quality, excellent gradient and color balance. The employment of the reversal and noncontact development when the plurality of toner images are piled up on the image retainer allows a clear image and the wear of the photosensitive member to be reduced. In addition to the above advantages, a number of favourable effects include facilitating the control of the developing operation without waste of time at the time of development of each latent image.

EXAMPLE 5

Figure 19:
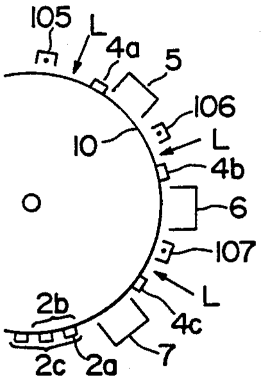
FIG. 19 is a cross sectional view of part of the apparatus for forming an image for illustrating the flow chart.
Figure 17:
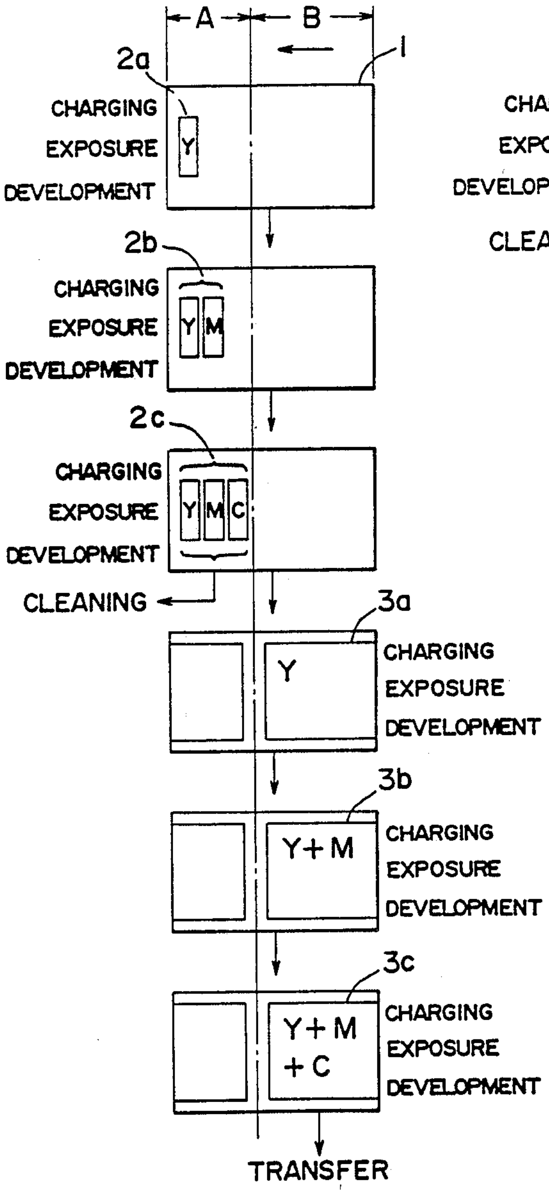

In this example, an image is formed by the apparatus of FIG. 19 for forming an image based on the image forming mode of the flowcharts of FIG. 17. The surface of the photosensitive member 10 is uniformly charged (first charging) with +600 by a charging device 105. Subsequently, the yellow reference signal is applied to a known helium.neon laser and the laser beam L modulated by the signal is irradiated (first image exposure) on the charged surface of the photosensitive member 10 to form the reference latent image. Thence the image is reversely developed (first development) by the developing device 5 as shown in the developing mode of FIG. 13 to form the yellow reference toner image (*2a* of FIG. 17) bearing yellow toner T.

Then the image retainer is recharged (second charging) by a scorotron charging device 106 and image exposure (second image exposure) by the laser beam from the laser based on the magenta reference signal causes the reference latent image to be formed. The image is then reversely developed (second development) by the developing device 6, whereby the magenta toner reference image bearing magenta toner T' is superposed at a position different from that of the yellow toner reference image (*2b* of FIG. 17 being formed).

In the same manner, the multiple reference toner image (*2c* of FIG. 17) with the cyan toner reference image superposed thereon is formed (in region A of FIG. 17) through the recharging by a charging device 107, the image exposure (third image exposure) by the laser beam L from the laser modulated by the cyan reference signal and the development (third development) by the developing device 7. Subsequently, the yellow toner picture image (*3a* of FIG. 17) is formed (in region B of FIG. 17) through the uniform positive charging by the charging device based on the data derived from the reference toner image, the image exposure L according to the yellow image signal and the development by the developing device 5. The reference toner image 2c is removed by the charge eliminating device before cleaning and the cleaning blade. After the yellow toner picture image is formed (up to region A of FIG. 17), the toner picture image (3b of FIG. 17) with the magenta toner picture image superposed thereon is formed through the charging by the charging device 106, the image exposure L and the development by the developing device 6. Subsequently, the multiple toner picture image (3c of FIG. 17) with the cyan toner picture image piled thereon is formed through the charging by the charging device 107, the image exposure L and the development by the developing device 7. This toner image is made readily transferable by a charging device (not shown) before being transferred to recording paper. The developing mode by each developing device for forming the reference toner image and the toner picture image is shown in FIG. 13. That is, each reference toner image is developed in such a manner as to be superposed at a mutually different position and each toner picture image is so developed as to be superposed at the same and different positions. Moreover, the recording paper P onto which the toner picture image has been transferred is subjected to fixation by the heated roller of a fixing device and then discharged.

In this example, the method involved uses an external reference and image signals to form the reference toner image and the toner picture image and transfer the toner picture image while removing the reference toner image. Accordingly, it makes possible selecting varieties of positions where the reference toner image is placed and almost the whole surface of the photosensitive member can be utilized for forming the toner picture image.

In this example, moreover, since a multiple toner picture image can be formed by turning the photosensitive member once, image forming efficiency is improved so that it is as efficient as is the case with monochrome image formation.

The reference toner image may be formed according to the image signal and the signal applied by a beam source with a predetermined density difference. The order of forming cyan, magenta and yellow toner images may freely be changed as required.

EXAMPLE 6

Figure 18:
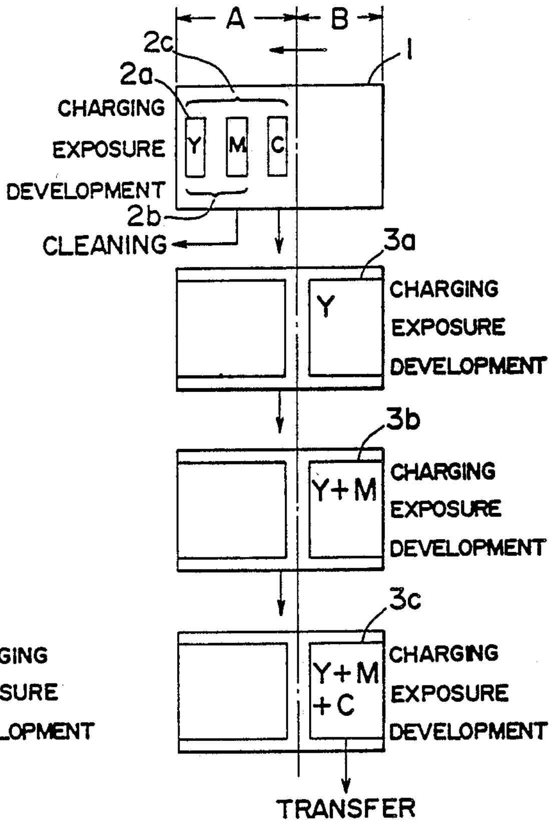

The difference between this example and the example 5 is that an image is formed according to the image forming mode of the flowchart of FIG. 18. In other words, the reference latent images are formed in the region A at a time as the photosensitive member 10 rotates and subsequently the latent images are respectively developed by the developing devices simultaneously and superposed at a mutually different position to form the multiple reference toner image 2c. The formation of the toner image 2c is followed by that of the multiple toner picture image 3c in the region B with the latent color picture images and color toner picture images piled up thereon. At this time, the reference toner image 2c is removed by the cleaning device, whereas the toner picture image 3c is transferred to transfer paper P. After the transfer, the photosensitive member 1 is cleaned by the cleaning device in preparation for the following image formation. The transfer paper P carrying the toner image 3c with it is subjected to fixation with heat by the fixing device and discharged. In this example, because the reference color toner images are formed simultaneously and because the toner picture image is formed by turning the photosensitive once, operational efficiency is extremely high with an advantage of forming the toner picture image using almost the whole surface of the photosensitive member.

As is obvious from the examples 5, 6 according to the present invention, the plurality of toner images superposed on the photosensitive member and transferred to recording paper simultaneously do not necessitate a transfer drum and, because the toner picture image can be formed utilizing almost the whole surface of the image retainer, the image retainer is small; hence, the apparatus for forming an image is made more compact. Moreover, because the toner picture image is formed by turning the retained image once, this provides efficiency as high as that of the formation of monochrome images. Further, because an image is formed according to the data derived from the reference toner image, there is obtained a multicolor image of good quality, excellent gradient and color balance. The reversal and non-contact development adoptable when the plurality of toner images are formed by superposing them on the image retainer provides, in addition to a number of favorable effects, a clear bright image, while reducing the wear of the photosensitive member, facilitates, and is capable of controlling, the developing operation at the time of developing each latent image without waste of time.

What is claimed is:

1. A multicolor image forming apparatus comprising:

a movable image retainer having a photoconductive layer;

charging means for charging a surface of said image retainer;

image exposing means for exposing said image retainer based upon reference signals and picture image signals to form latent reference images and latent picture images;

a plurality of developing means for forming toner reference images and toner picture images by developing said latent reference images and latent picture images with different toners;

transfer means for transferring said toner picture images on said images retainer to a transfer material;

cleaning means for removing remaining toner from said image retainer;

condition setting means for setting image forming conditions by detecting information from said toner reference images; and control means for operating said image exposing means so that, based upon said reference signals, said latent reference images corresponding to different colors are formed on regions of said image retainer to form the toner reference images on said image retainer and, based upon said picture image signals, said latent picture images are formed on a common region of said image retainer to form the toner picture images on said image retainer, and operating said transfer means to transfer the toner picture images on said image retainer to the transfer material.

2. The apparatus of claim 1 wherein said control means controls said apparatus so that transfer of said toner reference images to said transfer material is prevented.

3. The image forming apparatus of claim 2 wherein said control means operates said cleaning means so that the toner reference images on said image retainer are removed.

4. The image forming apparatus of claim 1 wherein said control means operates said cleaning means so that the toner reference images on said image retainer are removed.

5. The image forming apparatus of claim 1 wherein said developing means develops portions of the latent images formed on said image retainer with different color toners, whereby electrical potential of said latent images is reduced.

6. The image forming apparatus of claim 1 wherein said toner reference images are formed by repeating, a plurality of times, charging by the charging means, image exposing by the image exposing means based upon the reference signal, and developing by the developing means.

7. The image forming apparatus of claim 1 wherein said control means controls said apparatus so that the latent reference images corresponding to a plurality of colors are formed, one at a time by said image exposing means, and the toner reference images corresponding to the plurality of colors are formed by one rotation of said image retainer by selectively operating said plurality of image developing means.

8. The image forming apparatus of claim 1, wherein said image exposing means forms the latent reference images and the latent picture images based upon both applied reference signals and the picture image signals.

9. A multicolor image forming apparatus comprising;
- a movable image retainer having a photoconductive layer;
- charging means for charging the surface of said image retainer;
- image exposing means for exposing said image retainer based on reference signals and picture image signals to form latent reference images and latent picture images;
- a plurality of developing means for forming toner reference images and toner picture images by developing said latent reference images and latent picture images with different color toners;
- transfer means for transferring said toner picture images on said image retainer to a transfer material;
- cleaning means for removing remaining toner from said image retainer;
- condition setting means for setting image forming conditions by detecting information from said toner reference images; and
- control means for operating said charging means so that a surface of the image retainer is uniformly charged;
- operating said image exposing means so that, based upon said reference signals, said latent reference images corresponding to different colors are formed on regions of said image retainer and, based upon said picture image signals, said latent picture images are formed on a common region of said image retainer;
- operating said plurality of developing means selectively;
- repeating operation of said charging means, image exposing means and developing means to form said toner picture images on said image retainer;
- operating said transfer means to transfer only said toner picture images to the transfer material; and
- operating said cleaning means to remove the toner reference images on said image retainer.

10. The image forming apparatus of claim 9 wherein said control means controls said apparatus so that the toner reference images are removed by said cleaning means after the toner reference images are formed on said image retainer and said condition setting means is operated.

11. The image forming apparatus of claim 9 wherein said toner reference images are formed by repeating, a plurality of times, charging by the charging means, image exposing by the image exposing means based upon the reference signal, and developing by the developing means.

12. The image forming apparatus of claim 9, wherein said control means controls said apparatus so that the latent reference images corresponding to a plurality of colors are formed, one at a time, by said image exposing means, and the toner reference images corresponding to the plurality of colors are formed by one rotation of said image retainer by selectively operating said plurality of image developing means.

13. The image forming apparatus of claim 9, wherein said image exposing means forms the latent reference images and the latent picture images based upon both applied reference signals and the picture image signals.

14. A multicolor image forming apparatus comprising;
- a movable image retainer having a photoconductive layer;
- charging means for charging a surface of said image retainer;
- image exposing means for exposing said image retainer based on reference signals and picture image signals to form latent reference images and latent picture images;
- a plurality of developing means for developing toner reference images and toner picture images by developing said latent reference images and said latent picture images with different color toners;
- transfer means for transferring said toner picture images on said image retainer to a transfer material;
- cleaning means for removing remaining toner from said image retainer;
- condition setting means for setting image forming conditions by detecting information from said toner reference images;
- control means for operating said charging means so that the surface of the image retainer is uniformly charged;
- operating said image exposing means so that, based upon said reference signals, said latent reference images corresponding to different colors are formed on regions of said image retainer;
- selectively operating said plurality of developing means to form said toner reference images on said image retainer;
- operating said charging means so that the surface of the image retainer is uniformly charged after said condition setting means is operated;
- operating said image exposing means so that, based upon said picture image signals, said latent picture images are formed on a common region of said image retainer;
- operating said plurality of developing means selectively;
- forming the toner picture image on said image retainer by repeating the operation of said charging means, image exposing means, and developing means to form said toner picture images on said image retainer; and operating said transfer means to transfer said toner picture images to the transfer material.

15. The image forming apparatus of claim 14 wherein said toner reference images are formed by repeating, a plurality of times, charging by the charging means, image exposing by the image exposing means based upon the reference signal, and developing by the developing means.

16. The image forming apparatus of claim 14, wherein said control means controls said apparatus so that the latent reference images corresponding to a plurality of colors are formed, one at a time, by said image exposing means, and the toner reference images corresponding to the plurality of colors are formed by one rotation of said image retainer by selectively operating said plurality of image developing means.

17. The image forming apparatus of claim 14, wherein said image exposing means forms the latent reference images and the latent picture images based upon both applied reference signals and the picture image signals.

* * * * *